(12) United States Patent
Sunaga et al.

(10) Patent No.: US 8,743,944 B2
(45) Date of Patent: Jun. 3, 2014

(54) DECISION FEEDBACK EQUALIZING METHOD AND EQUALIZER

(75) Inventors: Kazuhisa Sunaga, Minato-ku (JP); Koichi Yamaguchi, Minato-ku (JP)

(73) Assignee: NEC Corporation, Tokyo (JP)

(*) Notice: Subject to any disclaimer, the term of this patent is extended or adjusted under 35 U.S.C. 154(b) by 911 days.

(21) Appl. No.: 12/440,880

(22) PCT Filed: Jul. 25, 2007

(86) PCT No.: PCT/JP2007/064573
§ 371 (c)(1),
(2), (4) Date: Mar. 11, 2009

(87) PCT Pub. No.: WO2008/032492
PCT Pub. Date: Mar. 20, 2008

(65) Prior Publication Data
US 2009/0285277 A1    Nov. 19, 2009

(30) Foreign Application Priority Data

Sep. 14, 2006 (JP) .................................. 2006-249320

(51) Int. Cl.
*H04L 27/10* (2006.01)

(52) U.S. Cl.
USPC .......................................... 375/233; 375/291

(58) Field of Classification Search
CPC ................. H04L 25/03057; H04L 2025/0349; H04L 25/03146
USPC ........................... 375/286–291, 233, 232, 290
See application file for complete search history.

(56) References Cited

U.S. PATENT DOCUMENTS

| | | | |
|---|---|---|---|
| 4,078,159 A | * | 3/1978 | Lender et al. .................. 375/214 |
| 4,471,319 A | * | 9/1984 | Metz .............................. 330/149 |
| 4,866,736 A | | 9/1989 | Bergmans |
| 5,742,642 A | | 4/1998 | Fertner |
| 6,697,424 B1 | * | 2/2004 | Yang et al. ...................... 375/233 |
| 7,151,796 B2 | * | 12/2006 | Allpress et al. ................. 375/229 |
| 2004/0264562 A1 | * | 12/2004 | Wu et al. ......................... 375/233 |
| 2005/0040864 A1 | * | 2/2005 | Ficken et al. .................... 327/65 |
| 2006/0291552 A1 | * | 12/2006 | Yeung et al. .................... 375/233 |
| 2007/0064787 A1 | * | 3/2007 | Jaussi et al. ..................... 375/232 |
| 2012/0207196 A1 | * | 8/2012 | Zerbe et al. ..................... 375/219 |

FOREIGN PATENT DOCUMENTS

| | | |
|---|---|---|
| JP | 54-104758 A | 8/1979 |
| JP | 63-316934 A | 12/1988 |
| JP | 2000-286763 A | 10/2000 |
| JP | 2001-503227 A | 3/2001 |
| JP | 2006-33663 A | 2/2006 |

OTHER PUBLICATIONS

Yamaguchi et al. "12 Gb/s Duobinary Signaling with x2 Oversampled Edge Equalization", ISSCC 2005. Feb. 2005, pp. 70-71.*
Kouichi Yamaguchi,et. al., "12Gb/s Duobinary Signaling with x2 Oversampled Edge Equalization". 2005 IEEE International Solid-State Circuits Conference, 2005, pp. 70-71 and 585, vol. 48.
M. Sorna, et al., "A 6.4Gb/s CMOS SerDes Core with Feedforward and Decision-Feedback Equalization", 2005 IEEE International Solid-State Circuits Conference, 2005, pp. 62-63 and 585, vol. 48.

* cited by examiner

*Primary Examiner* — Sophia Vlahos
(74) *Attorney, Agent, or Firm* — Sughrue Mion, PLLC

(57) ABSTRACT

A decision feedback equalizer is provided for correcting ISI on a first postcursor without using received decision data of a preceding bit. The decision feedback equalizer includes an amplifying circuit that is to be supplied with received data, a duobinary signal decision device for determining an output signal from the amplifying circuit, the duobinary signal decision device including a flip-flop, a shift register for successively shifting a decision result held by the flip-flop, and a plurality of current control blocks that are to be supplied with respective output signals from the shift register, and feeding back output signals to an output terminal of the amplifier to control the potential thereof.

18 Claims, 19 Drawing Sheets

DECISION FEEDBACK EQUALIZING METHOD AND EQUALIZER

TECHNICAL FIELD

The present invention relates to a waveform equalizer and more particularly to a decision feedback equalizer (DFE).

BACKGROUND ART

In recent years, problems have been posed by intersymbol interference (ISI) due to signal attenuations on PCBs (Printed Circuit Boards) for high-speed signal transmission such as interchip serial data communications or the like. As shown in FIG. 1, ISI is a phenomenon wherein when a transmitted 1-bit signal is received, its waveform is deformed into a tail that tends to interfere with successive bits. Heretofore, it has been the prevailing practice to suppress interferences by using waveform equalizing technology incorporated in transmitting circuits. However, it has become difficult for the waveform equalization in transmitting circuits to achieve highly accurate waveform equalization control for handling large signal attenuations.

Waveform equalization in a transmitting circuit is controlled by its waveform equalization coefficient, which is set to an optimum value based on the reception result at a receiving circuit. Therefore, the receiving circuit has to transmit the reception result to the transmitting circuit, and needs a transmission mechanism. Furthermore, as the communication rate increases, the band of the data signal increases, and hence the number of successive bits (postcursors) affected by ISI also increases (see FIG. 1). As a result, the ISI of these cursors also has to be controlled, and optimum waveform equalization cannot be achieved by only the waveform control quantity which the transmitting circuit can provide.

For the above reasons, high-speed signal transmission in recent years has seen a growing demand for waveform equalization in receiving circuits. As a result, much waveform equalization is being performed by decision feedback equalizers. The decision feedback equalizer adds a control quantity for correcting ISI from a past signal in superimposed relation to a present received signal D(n) for the equalization of the signal waveform. For example, an ISI quantity that is applied to a first postcursor by means of preceding signal D(n−1) is controlled and extracted from present signal D(n), thereby removing the effect that the ISI has on preceding signal D(n−1). At the same time, an ISI quantity that is applied to a second postcursor by means of signal D(n−2) which is two bits prior to present signal D(n) is controlled and extracted from present signal D(n), thereby removing the effect that the ISI has on signal D(n−2). Generally, immediately preceding bit D(n−1) imposes the greatest ISI on present received signal D(n). In other words, correcting the first postcursor of each data is highly effective in waveform equalization.

FIG. 2 is a block diagram of a general decision feedback equalizer which employs a full-rate clock. A signal that is transmitted from transmitting circuit 100 is received by amplifying circuit 1 in receiving circuit 102' via transmission path 101. Amplifying circuit 1 has a feature, for example, that it has a high-impedance input terminal provided by the gate terminal of a transistor. Amplifying circuit 1 provides an output signal to controlled terminal 2. D flip-flop DFF4-1 receives the output signal to determine whether the signal is binary data "1" or "−1". The D flip-flop DFF, as described herein, may be a general DFF or a signal detecting circuit for determining and holding data in synchronism with a clock such as a sampling latch signal. The determined data are successively shifted to D flip-flops DFF4-2 through DFF4-$n$ in synchronism with the clock. Output signals h1 through hn from the D flip-flops are applied to respective current control blocks 3-1 through 3-$n$ (CCB1 through CCBn), which control controlled terminal 2 to equalize the waveform at controlled terminal 2. For example, if past determined data hn represents "1", then its ISI appears in a postcursor, and appears in the present input signal which is n bits later. The ISI of the past data needs to be canceled for waveform equalization. Therefore, if hn represents "1", then a controlled current from current control block 3-$n$ is fed back to controlled terminal 2, canceling postcursor ISI due to data "1" which is n bits earlier. Thus, ISI on the present data can be canceled by past received data for waveform equalization. Since ISI is determined as being present or not depending on whether past determined data h1 through hn are "1" or "−1", controlled terminal 2 is adaptively controlled by h1 through hn for each bit.

The decision feedback controller shown in FIG. 2 operates under such conditions that total time Δtdfe of a data decision delay time of D flip-flop DFF4-1 (DFF delay time, etc.), a time for completing the control of controlled terminal 2 by current control block CCB1, and a preparation time (setup time) for receiving next time is smaller than time ΔT until next data arrive (bit period, e.g., 100 psec. for 100 bps). However, since bit period ΔT becomes smaller as the communication rate increases, allowable time of Δtdfe becomes shorter. Consequently, as there is no negative feedback time for immediately preceding data, a problem associated with high-rate communications arises in that it is difficult to cancel the ISI on the first postcursor, making it impossible to perform waveform equalization.

To address the above problem, Non-patent document 1 discloses an equalizer called a loop unrolled DFE/speculative DFE. This document handles the above problem as follows:

FIG. 3 shows an example of a loop unrolled DFE/speculative DFE. In this system as well, ISI which is imposed on present data and which is caused by data that are two bits or more prior to the present data is canceled by current control based on past decision data as with the DFE shown in FIG. 2. Therefore, D flip-flop DFF4-2 and subsequent D flop-flops are identical in arrangement to those of the equalizer shown in FIG. 2, and ISI on the second and subsequent postcursors at controlled terminal 2 is canceled out. The loop unrolled DFE/speculative DFE is different from the equalizer shown in FIG. 2 as to the arrangement for canceling ISI on the first postcursor which is responsible for the above problem. According to this system, unlike the equalizer shown in FIG. 2, decision data h1 is not fed back for canceling ISI on the first postcursor. In the loop unrolled DFE/speculative DFE shown in FIG. 3, two parallel amplifying circuits 5, 6 are connected to controlled terminal 2. Amplifying circuits 5, 6 have output terminals respectively as controlled terminals 7, 8 that are current-controlled by respective current control blocks CCB1+, CCB1−. Current control block CCB+ controls controlled terminal 7 with a current on the assumption that data that is one bit earlier represents "1". Current control block CCB− controls controlled terminal 8 with a current on the assumption that data that is one bit earlier represents "−1". This means that the data that is one bit earlier is speculatively decided. The signals from controlled terminals 7, 8 are input respectively to D flop-flops DFF4-1+, DFF4-1−, which speculatively determine the data. Output signals from D flop-flops DFF4-1+, DFF4-1− are input to elector circuit SEL, which selects a speculatively determined result based on the determined value of output signal h2 from D flip-flop DFF4-2 that represents the determined data which is determined one bit earlier than h1. The above description represents the arrangement and operating principle of the loop unrolled DFE/speculative DFE. Since there is no feedback path for feeding immediately preceding data h1 back to the present data, the problem of the feedback time of h1 is eliminated.

Non-patent document 1: M. Sorna, et al., "A 6.4 Gb/s CMOS SerDes core with feed-forward and decision-feedback equalization," in IEEE Int. Solid-State Circuits Conf. (ISSCC) Dig. Tech. Papers San Francisco, Calif., February 2005. pp. 62-63.

DISCLOSURE OF THE INVENTION

Problems to be Solved by the Invention

However, the loop unrolled DFE/speculative DFE shown in FIG. 3 suffers from the following two problems:

First, in order to speculatively determine the data, the immediately preceding data has to acquire both patterns of "1", "−1". Therefore, the loop unrolled DFE/speculative DFE needs circuits corresponding to amplifying circuits 5, 6 shown in FIG. 3, D flip-flop DFF4-1, a circuit corresponding to current control block CCB1, and selector circuit SEL as extra circuits, resulting in an increased circuit area and increased power consumption.

Secondly, though feedback of h1 is not necessary, the feedback time for the second bit is greater than with the decision feedback equalizer shown in FIG. 2. The minimum feedback time corresponding to A tdfe shown in FIG. 1 is equal to the total of the delay time of D flip-flop DFF4-2, the current limiting time of current control block CCB2, the delay time of amplifying circuit 5(6), and the setup time for D flop-flop DFF4-1+(DFF4-1−). Therefore, instead of the feedback time being eased up by the time of bit period ΔT, the acceptable range is reduced by the delay time of amplifying circuit 5(6). Further, inasmuch as the gate capacitances of both amplifying circuits 5, 6 serve as a load on controlled terminal 2, the delay of negative feedback is increased, making it difficult to increase the communication rate.

It is an object of the present invention to provide a decision feedback equalizing method and equalizer which will solve the above problems and which can correct ISI on a first postcursor without using received decision data of a preceding bit.

Means for Solving the Problems

A decision feedback equalizing method according of the present invention is one in which when the input waveform of a bit being presently received is equalized, the input waveform is equalized into a duobinary signal without using the decision data of a bit immediately prior to the bit.

A decision feedback equalizer according of the present invention includes an amplifying circuit that is to be supplied with received data, a duobinary signal decision device for determining an output signal from the amplifying circuit, the duobinary signal decision device including a flip-flop, a shift register for successively shifting a decision result held by the flip-flop, and a plurality of current control blocks that are to be supplied with respective output signals from the shift register, and feeding back output signals to an output terminal of the amplifier to control a potential thereof.

A decision feedback equalizer according of the present invention includes a plurality of parallel data reception blocks connected to a data input terminal, each of the parallel data reception blocks including an amplifying circuit that is to be supplied with received data, a duobinary signal decision device for determining an output signal from the amplifying circuit, the duobinary signal decision device including a flip-flop, and one or more current control blocks for controlling an output potential of the amplifying circuit, wherein the data reception blocks are supplied with clocks which are out of phase with each other, and data determined by the duobinary signal decision device of each of the data reception blocks are negatively fed back to the current control block or blocks of other one of the data reception blocks.

According to the present invention, when the input waveform of a bit being presently received is equalized by the control of a main tap and a control process which uses decision results of second and subsequent taps, the input waveform is equalized into a duobinary signal for correcting ISI on a first post cursor, without using the decision data of a bit immediately prior to the bit.

The equalized waveform at a controlled terminal is generally a binary waveform (NRZ: No Return to Zero). As shown in FIG. 4(1), however, since a single-bit response in binary transmission is greatly affected by ISI on a first postcursor, the control quantity for the first postcursor for equalizing the waveform into a binary waveform is very large. Therefore, feedback of bits for equalizing the effect of the first postcursor is indispensable. Even if there is no feedback as disclosed in Non-patent document 1, it is necessary to control the waveform depending on the decision data of the immediately preceding bit. The present invention is realized by paying attention to the characteristics in which almost no control is required of the first postcursor when the waveform of a signal transmitted through a transmission path is equalized into a duobinary waveform. According to the present invention, in view of the above characteristics, as shown in FIG. 4(2), when the waveform of an input bit is equalized into a duobinary waveform according to a decision and feedback process, only ISI on the second and subsequence postcursors, rather than on the first postcursor, is equalized to equalize the waveform of the input bit into a duobinary waveform. Alternatively, only the amplitude of a main cursor itself and ISI the on second and subsequence postcursors are equalized to equalize the waveform of the input bit into a duobinary waveform. As a result, since it is not necessary to control the waveform depending on the decision data of an immediately preceding bit, the waveform can sufficiently be equalized into a duobinary signal waveform using previous data (second and earlier bits in the past), without using the decision data of the immediately preceding clock which has heretofore caused problems.

According to the present invention, by equalizing the input waveform into a duobinary signal without using the decision data of the immediately preceding bit, ISI on the first postcursor is canceled without the addition of an extra circuit. Consequently, the communication rate can be increased without involving an increase in the size of the circuit area and the power consumption required for a loop unrolled DFE/speculative DFE.

Figure 1:
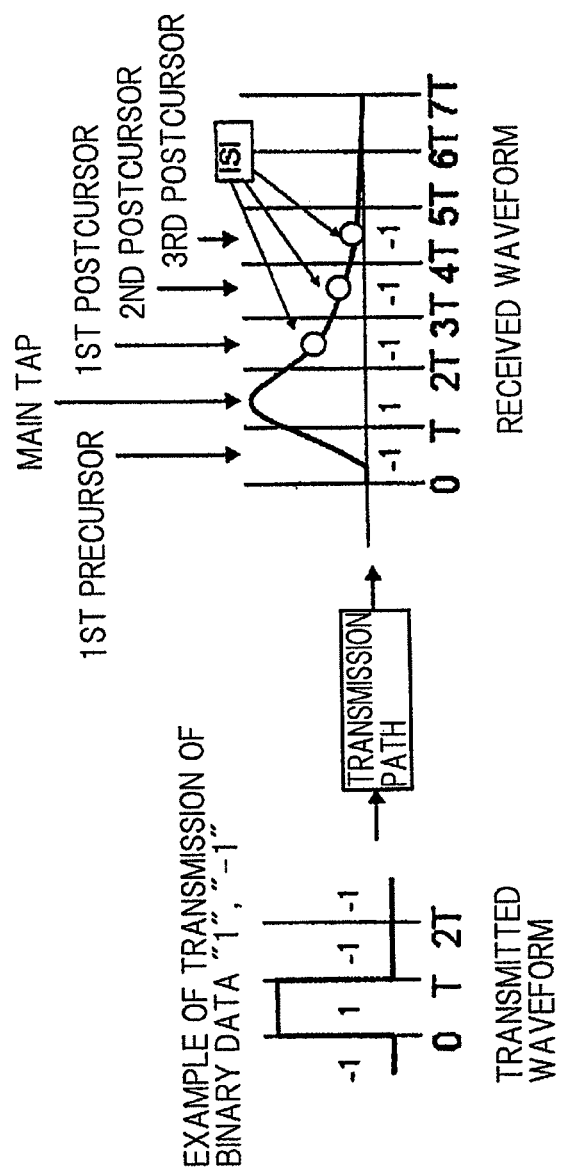
FIG. 1 is a diagram showing an example and definitions of intersymbol interference (ISI)
Figure 2:
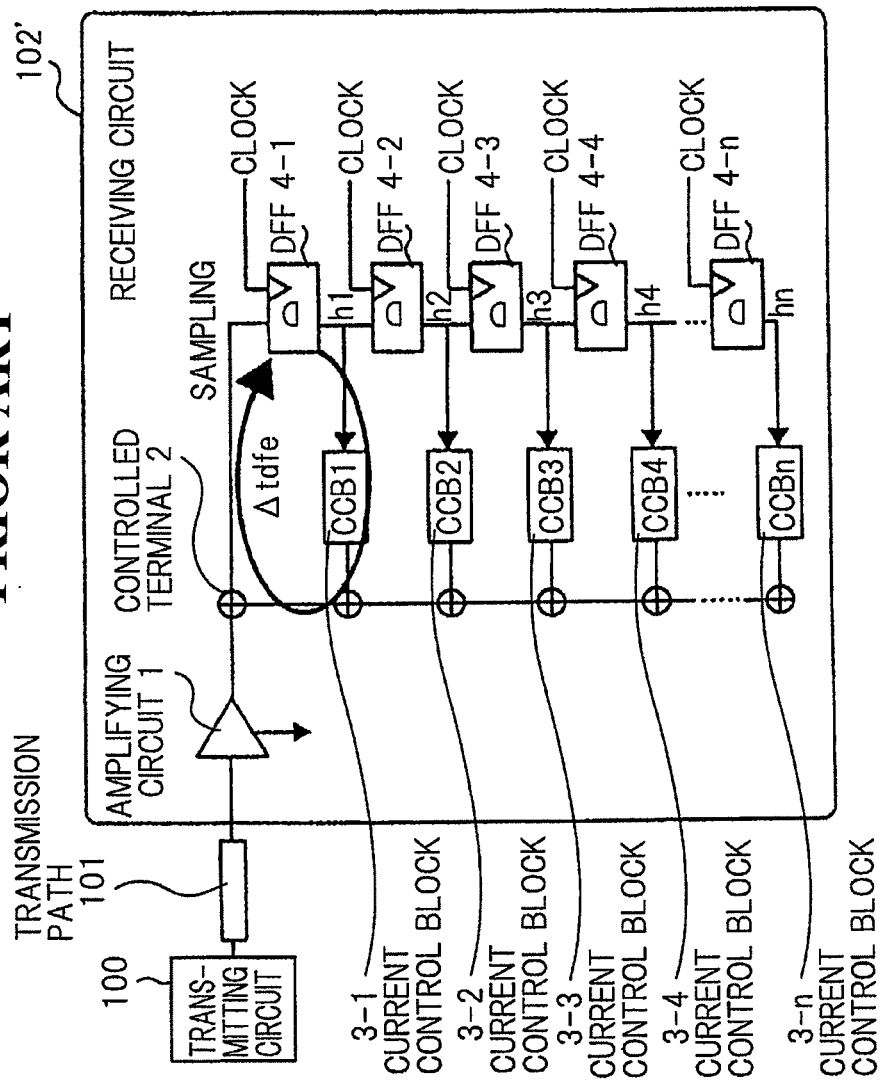
FIG. 2 is a block diagram of a decision feedback equalizer (full rate clock reception) according to the prior art.
Figure 3:
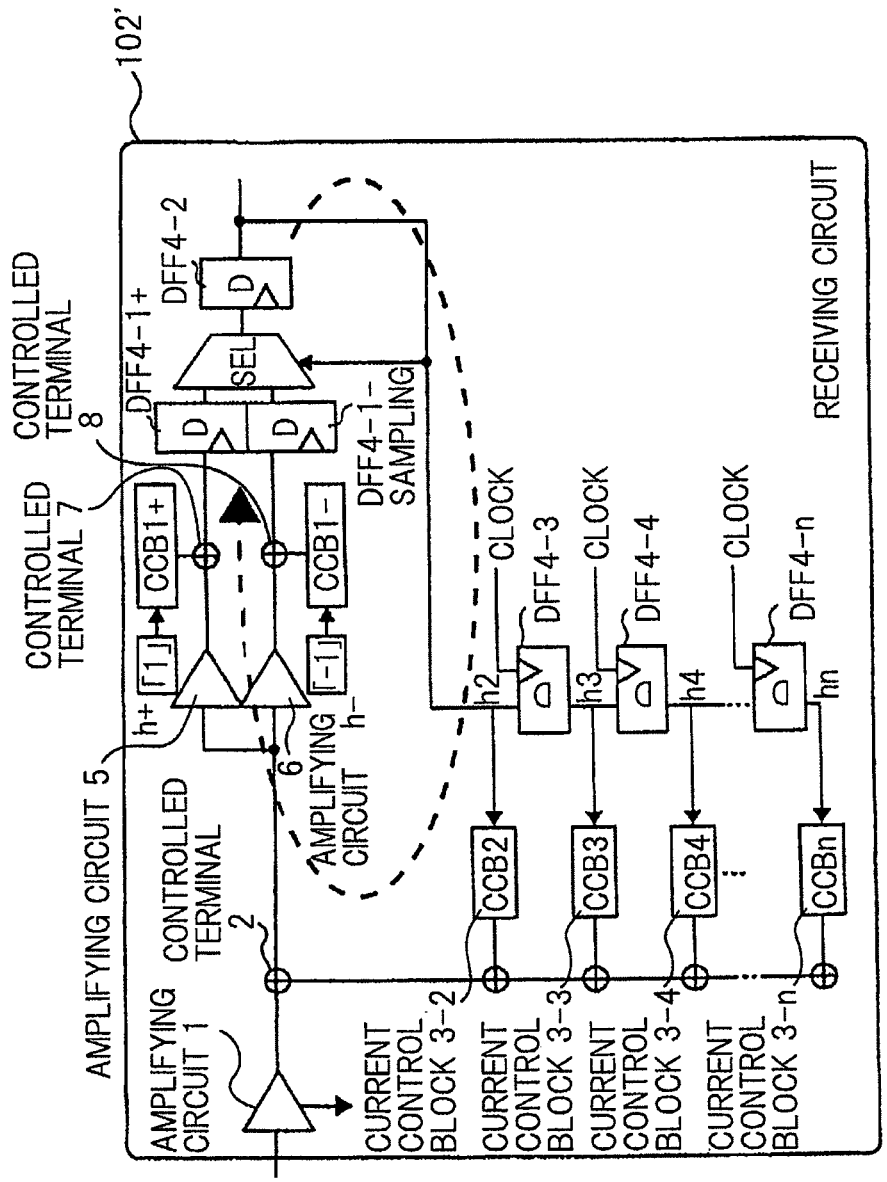
FIG. 3 is a block diagram of a loop unrolled DFE/speculative DFE (full rate clock reception) according to the prior art.
Figure 4:
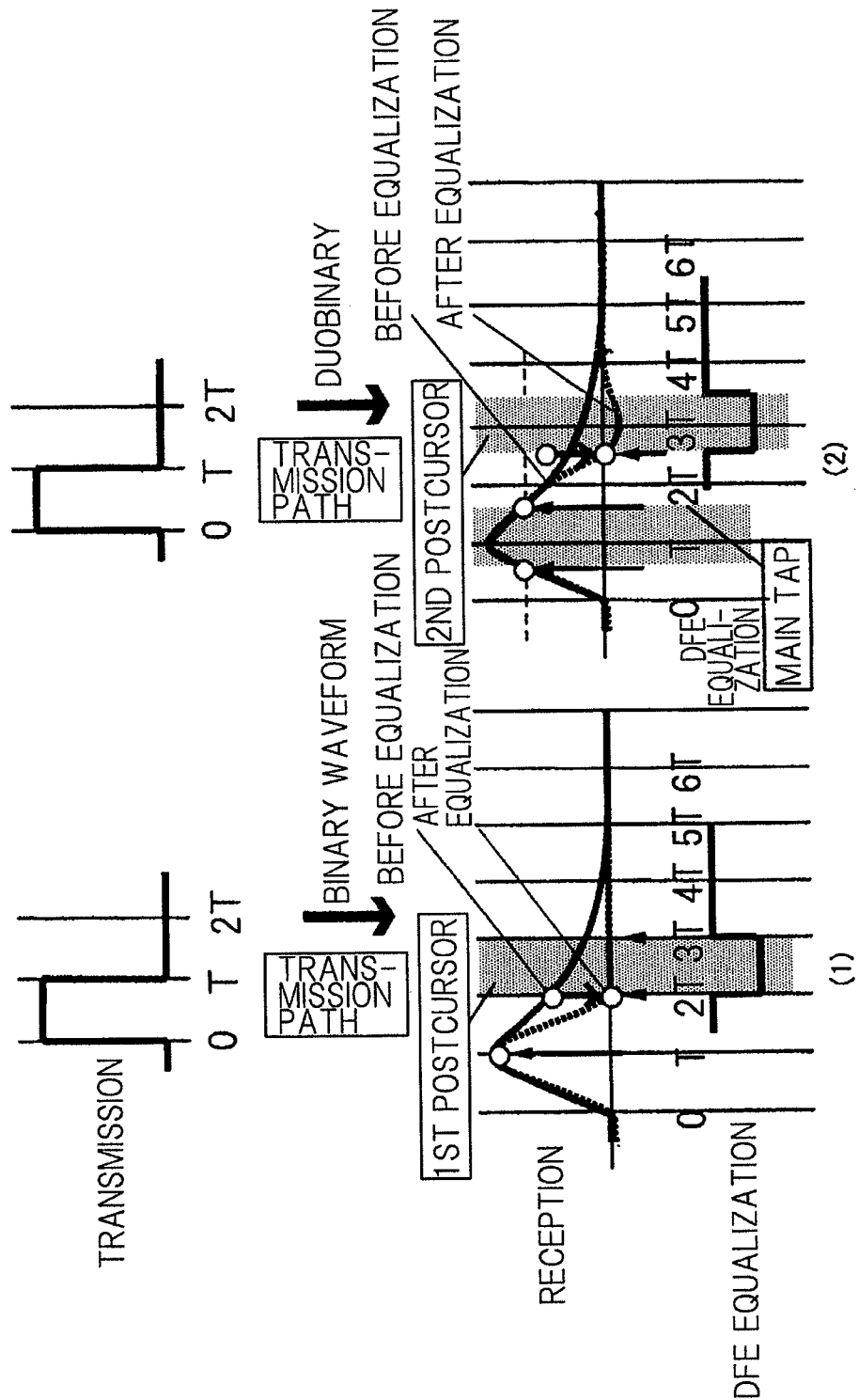
FIG. 4 is a diagram illustrative of binary waveforms and duobinary equalization by a decision feedback equalizer (DFE)

DESCRIPTION OF REFERENCE CHARACTERS 100 transmitting circuit
101 transmission path
102 receiving circuit
1 amplifying circuit
2 controlled terminal
3-0 through 3-*n* current control block
4 duobinary signal decision device
5 shift register

BEST MODE FOR CARRYING OUT THE INVENTION

1st Exemplary Embodiment

Figure 5:
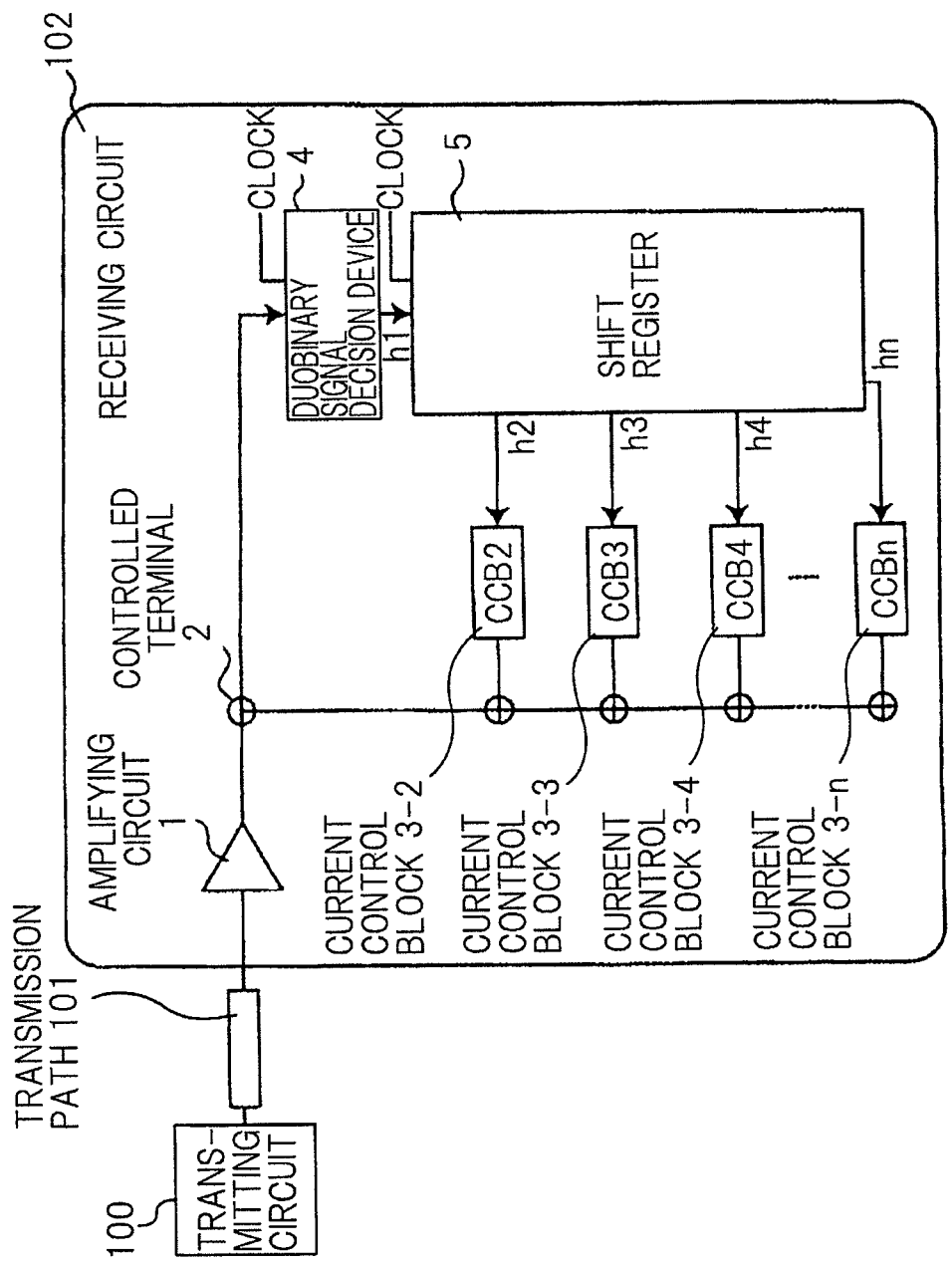
FIG. 5 is a block diagram of a duobinary decision feedback equalizer (full rate clock reception) according to the present invention.

FIG. 5 is a basic block diagram of a decision feedback equalizer according to a first exemplary embodiment of the present invention.

Data sent from transmitting circuit 100 is received by amplifying circuit 1 of receiving circuit 102 via transmission path 101. Amplifying circuit 1 is characterized in that it has a high-impedance input terminal. Output data from amplifying circuit 1 is determined by duobinary signal decision device 4.

An output signal from duobinary signal decision device 4 is input to shift register 5, which successively shifts the data held therein. Output signals h2 through hn from the registers in shift register 5 are input to respective current control blocks 3-2 through 3-*n* (CCB2 through CCBn) which control the potential of controlled terminal 2. The control on controlled terminal 2 is determined depending on shift register output signals h2 through hn, i.e., decision data received for the past two and more bits. A controlled quantity of current for controlled terminal 2 to be controlled by shift register output signal h1 is controlled using shift register output signals h2 through hn and the current control of current control blocks CCB2 through CCBn. Each terminal and each block is not limited to single-phase operation, but may be of differential operation. Current control blocks 3-2 through 3-*n* control the current based on the reception result of receiving circuit 102 according to the SS-LMS (sign sign Least Mean Square) algorithm which is in general use. Shift register 5 may comprise delay elements.

Figure 6:
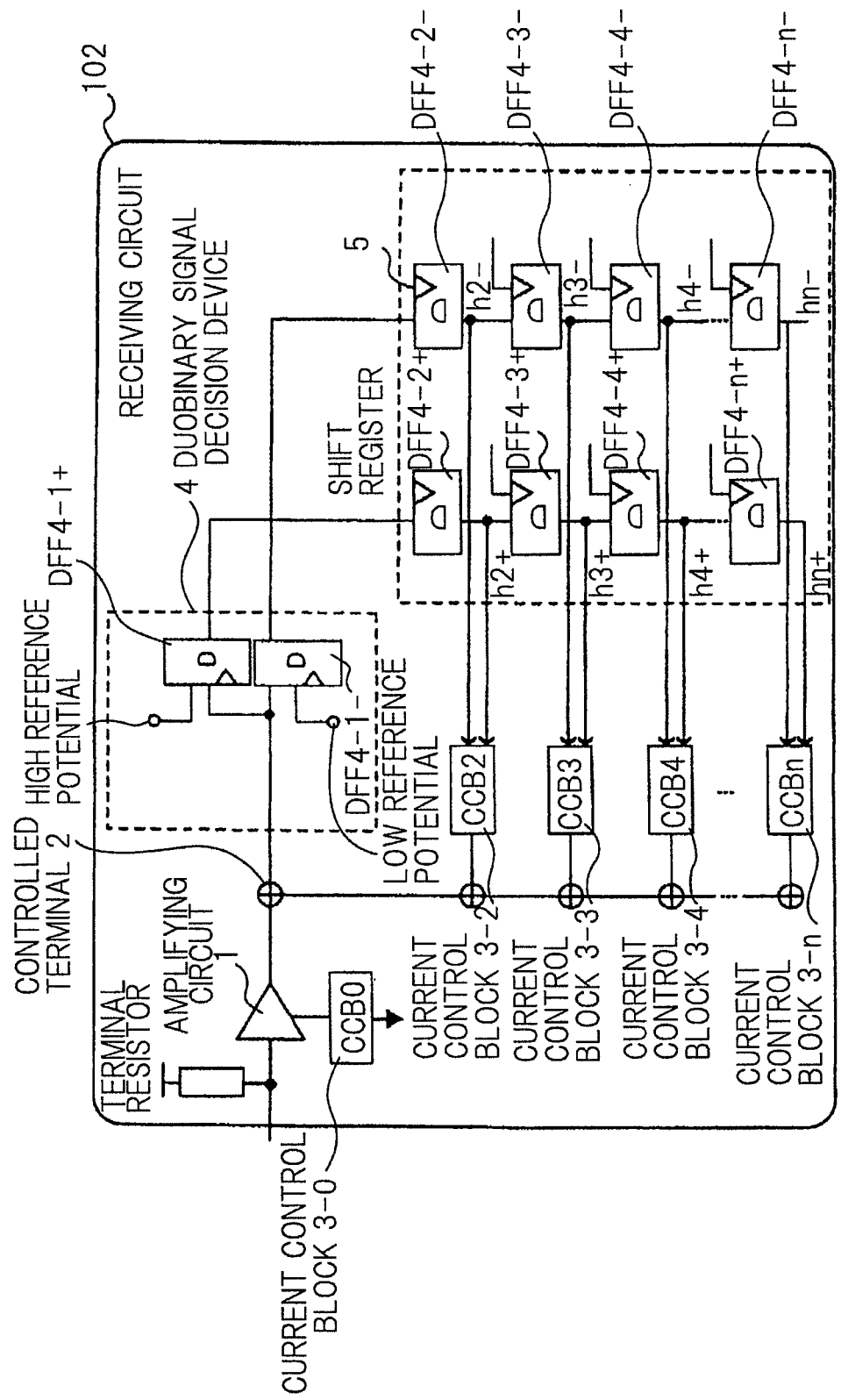
FIG. 6 is a block diagram of a duobinary decision feedback equalizer (full rate clock reception) according to a first exemplary embodiment of the present invention.
Figure 7:
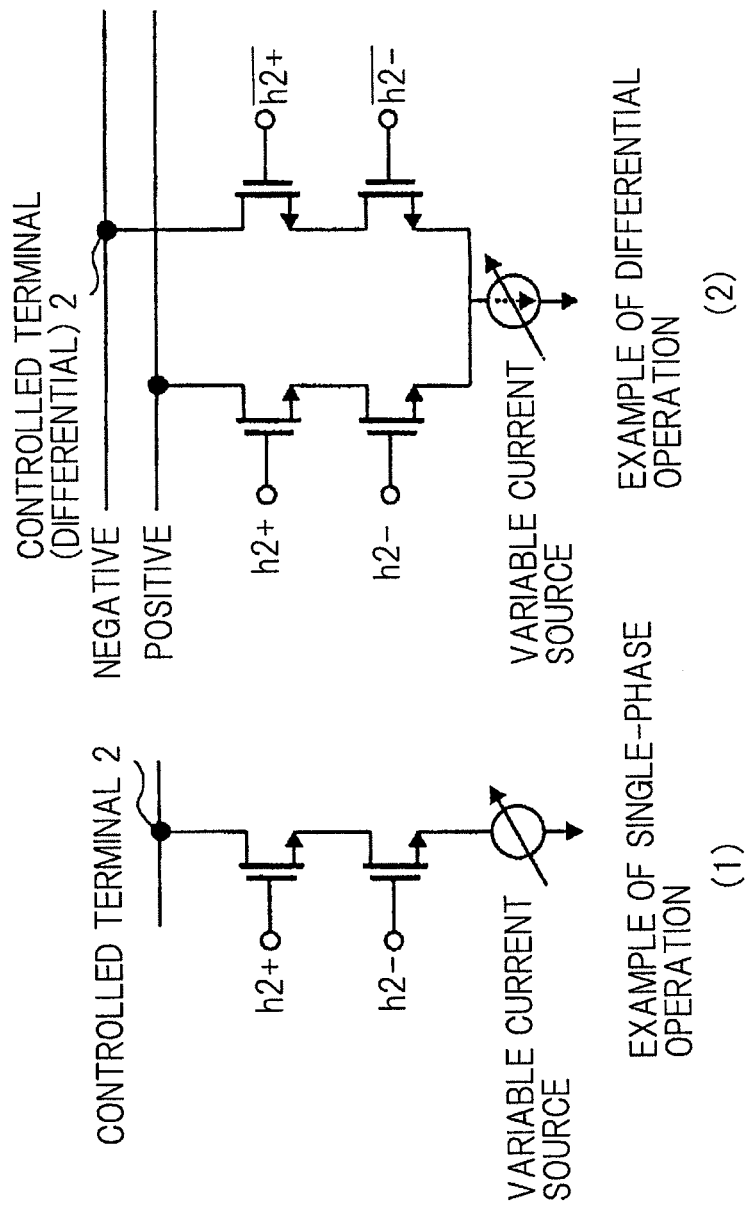
FIG. 7 is a diagram showing circuit examples of current control block CCB3.
Figure 8:
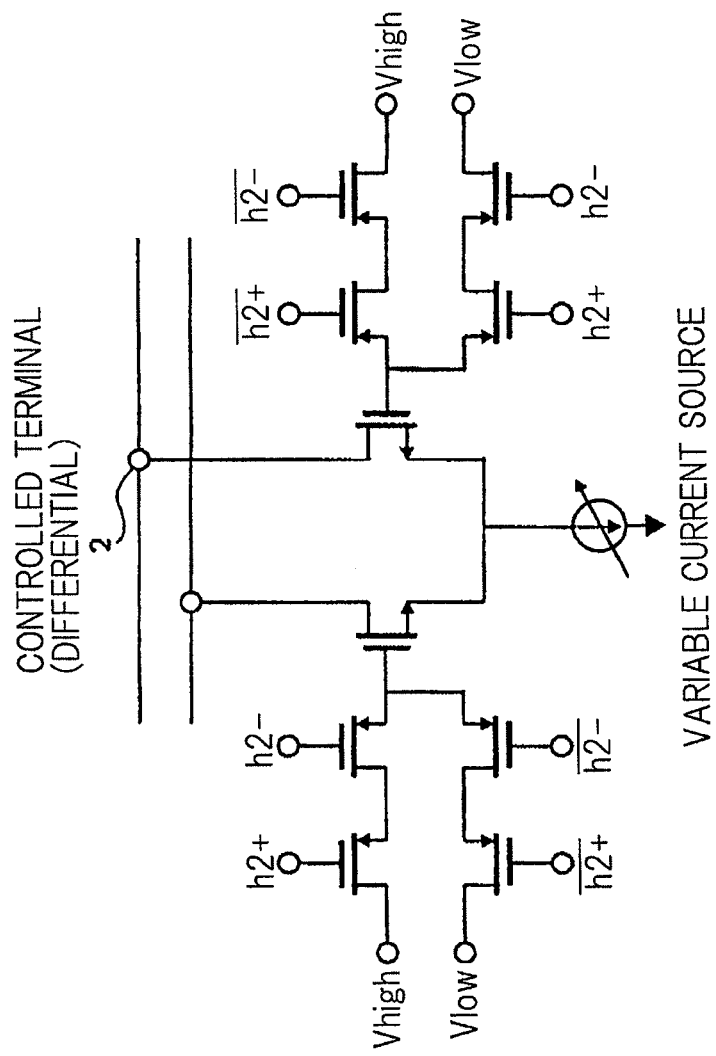
FIG. 8 is a diagram showing a circuit example of a CCB section (circuit controller 2 to n)
Figure 9:
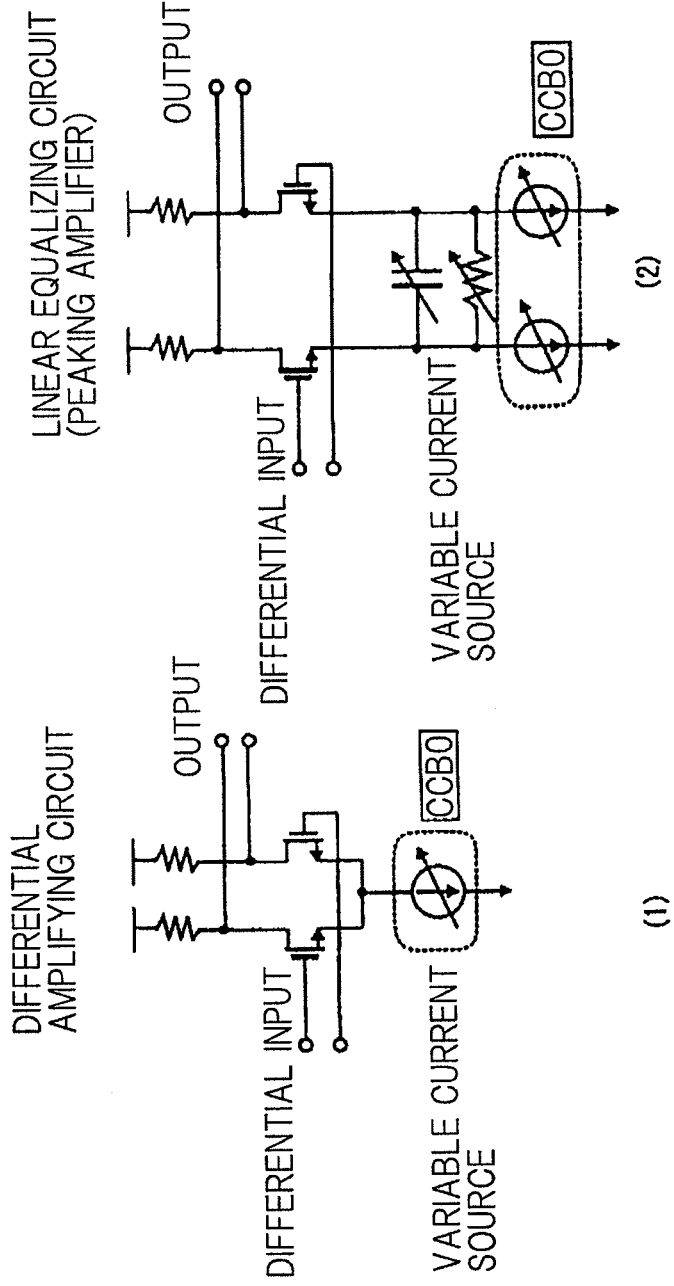
FIG. 9 is a diagram showing a circuit example of an amplifying circuit.
Figure 10:
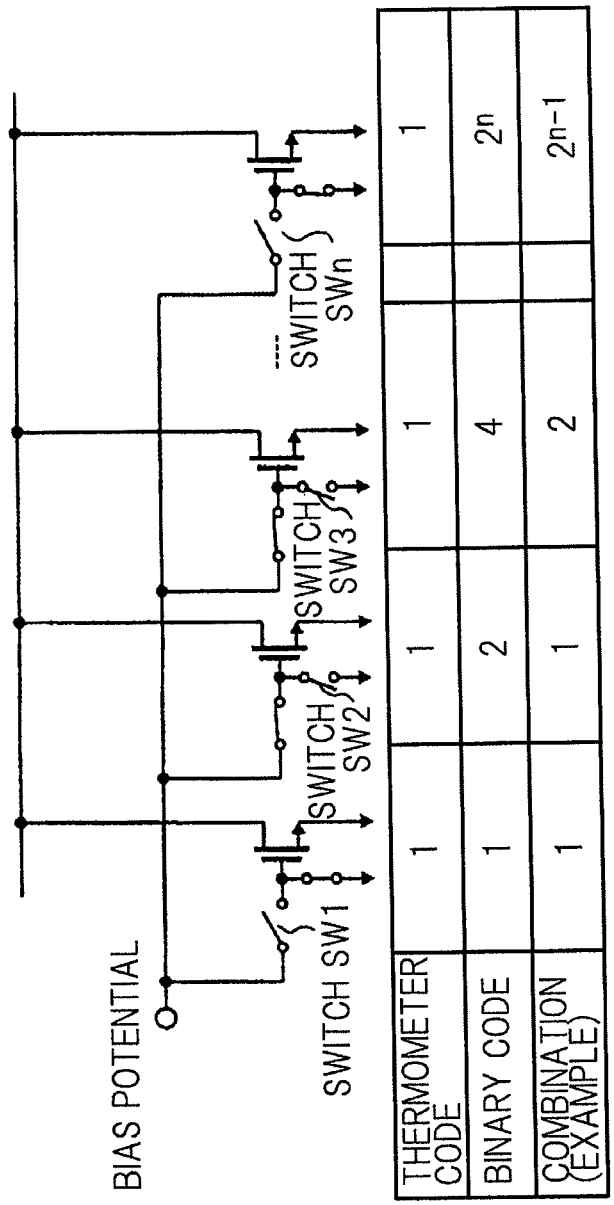
FIG. 10 is a diagram showing a circuit example of a variable current source of the CCB section.

FIG. 6 is a block diagram of a duobinary decision feedback equalizer which includes a configurational example of duobinary signal decision device 4 shown in FIG. 5. According to the present exemplary embodiment, duobinary signal decision device 4 comprises D flop-flops DFF4-1+, DFF4-1−. Controlled terminal 2 is connected to input terminals of D flop-flops DFF4-1+, DFF4-1− of duobinary signal decision device 4. Since a duobinary signal needs to be determined for three values, duobinary signal decision device 4 requires two reference potentials. The higher reference potential is referred to as a high reference potential, and the lower reference potential as a low reference potential. D flop-flop DFF4-1+ outputs the result of comparison between the high reference potential and an input potential representing the output signal from controlled terminal 2, and D flop-flop DFF4-1− outputs the result of comparison between the low reference potential and an input potential representing the output signal from controlled terminal 2. Output data detected by D flop-flop DFF4-1+ and D flop-flop DFF4-1− are input respectively to D flop-flop DFF4-2+ and D flop-flop DFF4-2− in shift registers 5 in synchronism with a next clock pulse. Similarly, when a clock pulse is input, the data are shifted respectively to D flop-flop DFF4-3+ and D flop-flop DFF4-3−. An output signal from D flop-flop DFF4-*k*+ is defined as hk+, and an output signal from D flop-flop DFF4-*k*− as hk−, where k represents a natural number in the range from 2 to n. Output signals hk+, hk− are input to the input terminals of current control blocks 3-*k* (where k represents 2 through n) for controlling controlled terminal 2. Circuit examples of current control block CCB are shown in FIG. 7. Current control block CCB2 shown in FIG. 6 will be described by way of example below. If current control block CCB2 is of a single-phase operation (FIG. 7(1)), then current control block CCB2 comprises a series-connected circuit of NMOSs that are supplied with output signals h2+, h2− and a variable current source. If current control block CCB2 is of a differential operation (FIG. 7(2)), then current control block CCB2 comprises a series-connected circuit of NMOSs that are supplied with output signals h2+, h2− and a series-connected circuit of NMOSs that are supplied with differential output signals /h2+, /h2−, the series-connected circuits being connected to a single variable current source. However, current control block CCB is not limited to the above circuit examples, but may be designed in an ANDing logic configuration for output signals h2+, h2−. Similarly, FIG. 8 also shows a circuit example of current control block CCB2 having an ANDing logic configuration. As shown in FIG. 6, amplifying circuit 1 itself controls controlled terminal 2 with current control block CCB0. Examples of a circuit made up of current control block CCB0 and amplifying circuit 1 are shown in FIG. 9. Since amplifying circuit 1 has a very high band for a high communication rate, a differential configuration (FIG. 9(1)) or a peaking amplifier (linear equalizer) (FIG. 9(2)) with capacitive degeneration may be employed. These current sources can be variably controlled. Amplifying circuit 1 and current control block CCB0 are not limited to these configurations, but may be configured to be able to control the output potential. FIG. 10 shows an example of a circuit for realizing a variable current source of current control block CCB. The variable current source is characterized in that the amount of current can be adjusted externally. This circuit example represents an example of a variable current source for controlling the amount of current with digital values. The variable current source may be of a mechanism for controlling the amount of current with analog potentials, or may be configured to control the amount of current with a thermometer code using digital values, or according to binary control, or according to a combination thereof, insofar as it can adjust the current value from an external source.

2nd Exemplary Embodiment

Figure 11:
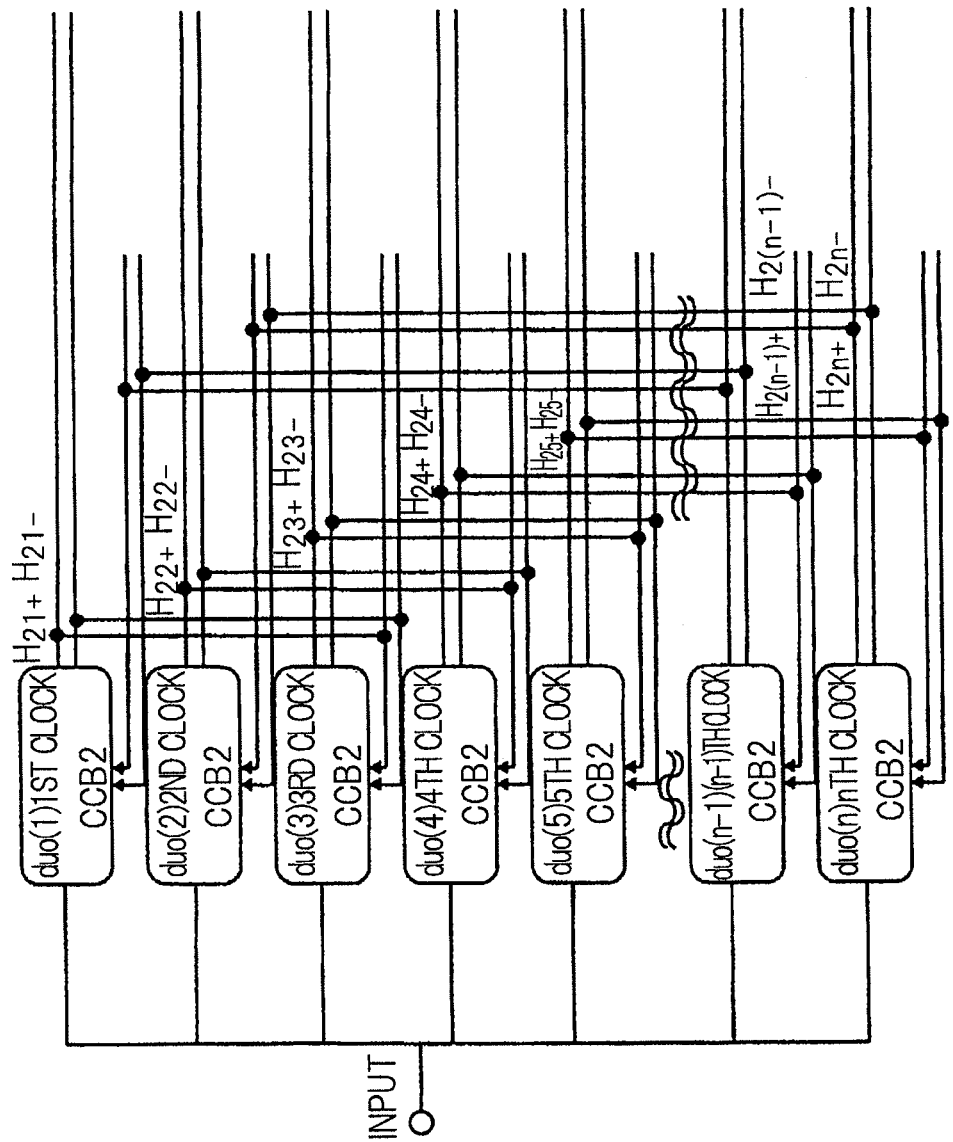
FIG. 11 is a block diagram of a duobinary decision feedback equalizer (multiphase clock (n-phase) reception) with feedback to only CCB2.

FIG. 11 shows an exemplary embodiment of a decision feedback equalizer for producing a duobinary waveform using multiphase clocks. The present exemplary embodiment represents a configuration for negatively feeding back, by one tap, data determined at each of multiphase clocks. Input data are supplied parallel to n (where n represents a natural number) data reception blocks duo(1) through duo(n), which are supplied with clocks that are out of phase with each other. Two output signals H2$k$+, H2$k$− of data reception block duo(k) which is supplied with each kth clock are negatively fed back to current control terminals CCB2 of data reception block duo(k+2) which is two clocks later than data reception block duo(k).

Figure 12:
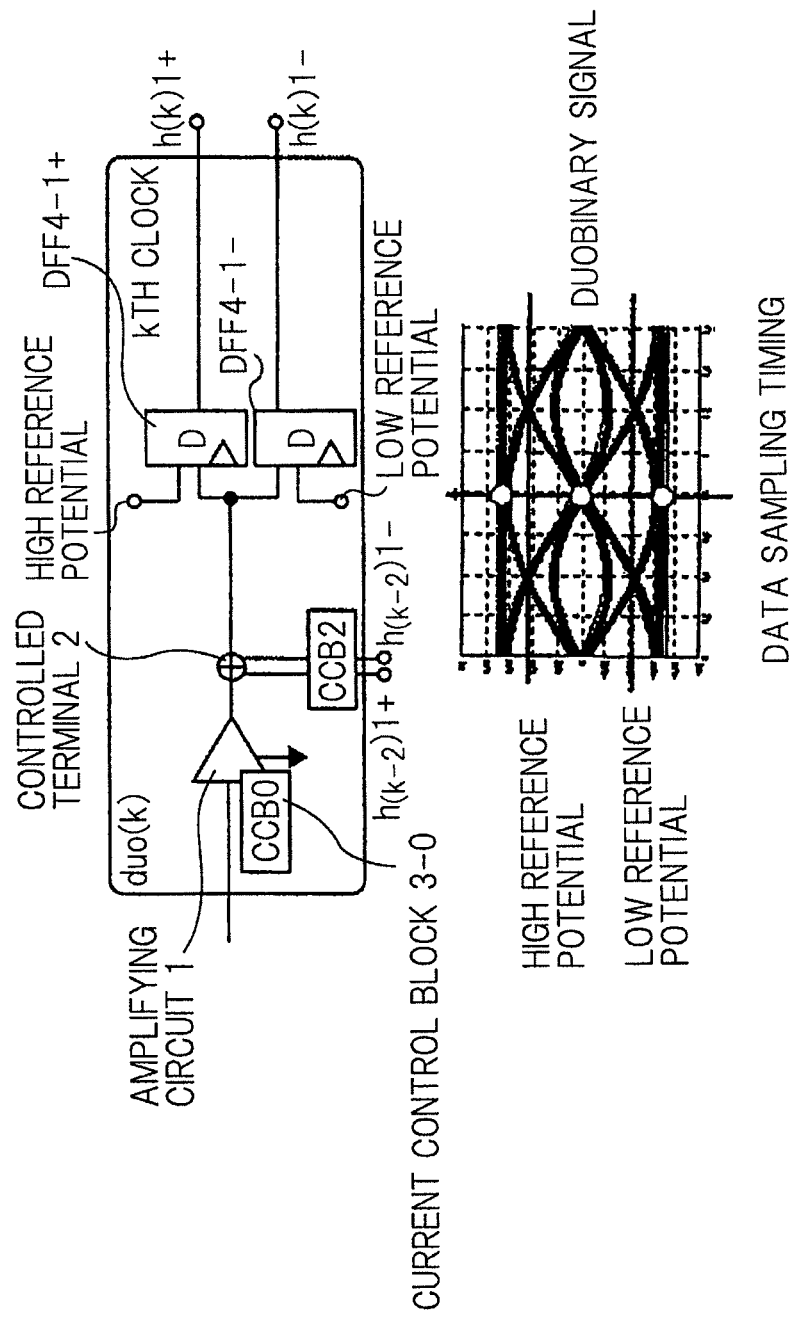
FIG. 12 is a block diagram of a data decision device of the duobinary decision feedback equalizer based on multiphase clocks with feedback to only CCB2.

FIG. 12 is a block diagram of data reception block duo(k) for the kth clock. Input data are input to amplifying circuit 1 having current control block 3-0. Amplifying circuit 1 is characterized in that it controls its output voltage and has a high-impedance input terminal. Amplifying circuit 1 applies an output potential to controlled terminal 2 to which current control block CCB2 is connected. Output data h(k−2)1+, h(k−2)1− from data reception block duo(k−2) (where k=3, 4, ..., n) (where n represents a natural number of 3 or greater) are input to current control block CCB2. Current control block CCB2 of data reception block duo(2) is supplied with negative feedback data from data reception block duo(n−1), and current control block CCB2 of data reception block duo(1) is supplied with negative feedback data from data reception block duo(n). The potential at controlled terminal 2 is controlled depending on these negative feedback data h(k−2)1+, h(k−2)1−, shaping the input data into a duobinary waveform. The potential at controlled terminal 2 which is controlled by current control block CCB2 is input to two D flip-flops DFF4-1−, DFF4-1+. D flip-flop DFF4-1+ is supplied with a high reference potential in addition to the potential at controlled terminal 2. Similarly, D flip-flop DFF4-1− is supplied with a low reference potential in addition to the potential at controlled terminal 2. These reference potentials serve as comparative potentials for determining the duobinary signal which is of tertiary data. D flip-flops DFF4-1+, DFF4-1− compare the input data to determine whether they are "0" or "1".

Figure 13:
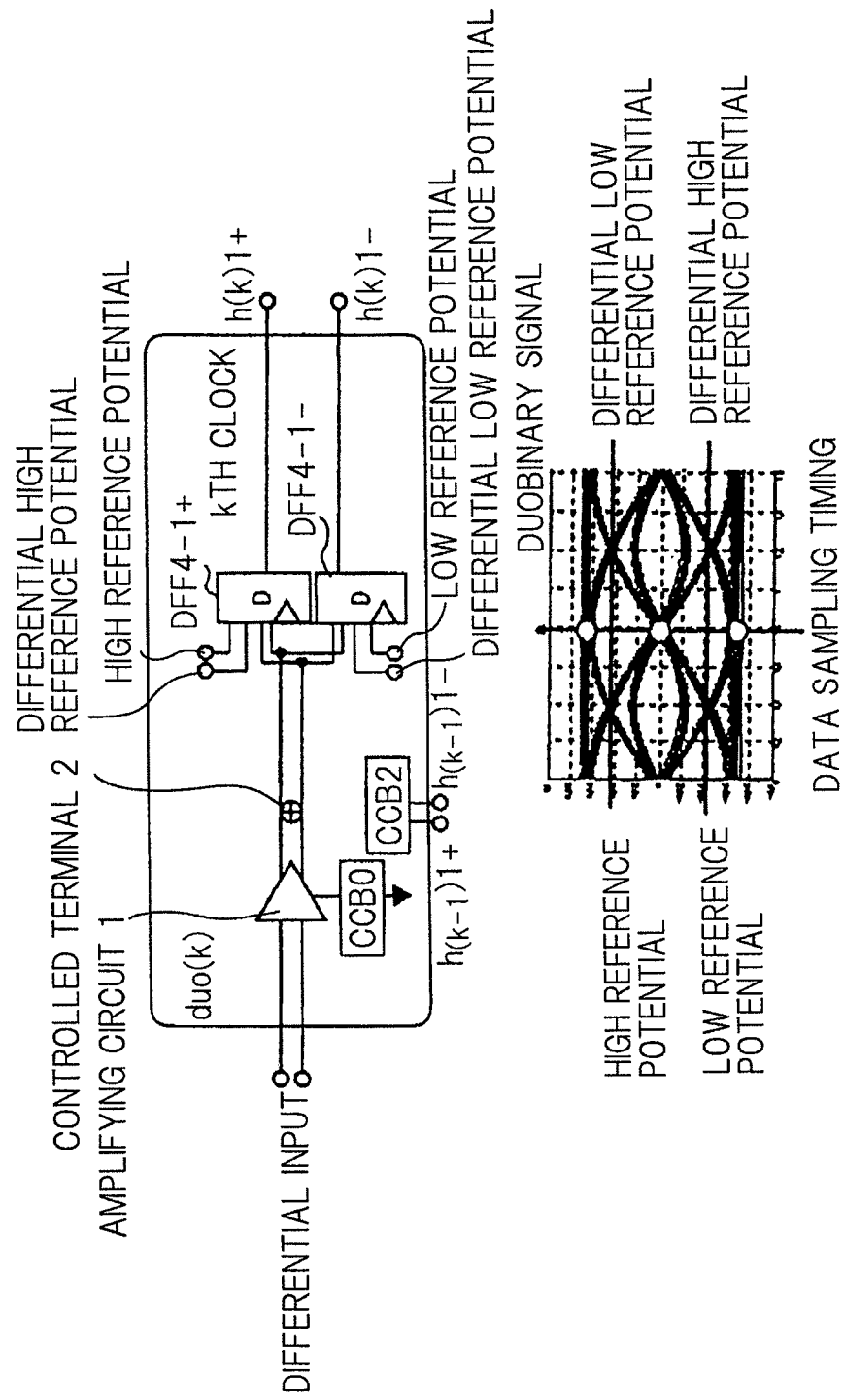
FIG. 13 is a block diagram of a data decision device (differential) of the duobinary decision feedback equalizer based on multiphase clock with feedback to only CCB2.

The above components may be of a differential configuration. FIG. 13 shows an example of the configuration thereof. Differential input signals are input to differential amplifying circuit 1, which applies a pair of differential output signals to controlled terminal 2 that is differential-current-controlled by current control block CCB2, shaping the input data into a duobinary signal. Output signals from controlled terminal 2 are input to D flip-flops DFF4-1+, DFF4-1− and differentially compared thereby with a high reference potential and a differential high reference potential (high reference potential>differential high reference potential) and with a low reference potential and a differential low reference potential (low reference potential<differential low reference potential), which serve as differential reference potentials, respectively. If it is assumed that differential input signals are represented by in, inb and reference potentials by ref, refb, then the output signal=1 or 0 when (in−ref)−(inb−refb)>0, and the output signal=0 or 1 when (in−ref)−(inb−refb)<0. The differential reference potentials are input symmetrically with respect to the common potential of differential duobinary signals, but may not be so input if they are to be adjusted to compensate for offset variations. If D flip-flops DFF4-1+, DFF4-1− comprise differential-output DFFs, then the data reception block produces differential output signals. If D flip-flops DFF4-1+, DFF4-1− comprise single-phase-output DFFs, then the data reception block produces single-phase output signals. These output signals serve as output signals h(k)1+, h(k)1− of the kth clock block. This output potential pair corresponds to output signal H2$k$ (where k represents a natural number of n or smaller) of each kth clock block.

The decision feedback equalizer of the above configuration realizes waveform equalization to produce a duobinary waveform.

3rd Exemplary Embodiment

Figure 14:
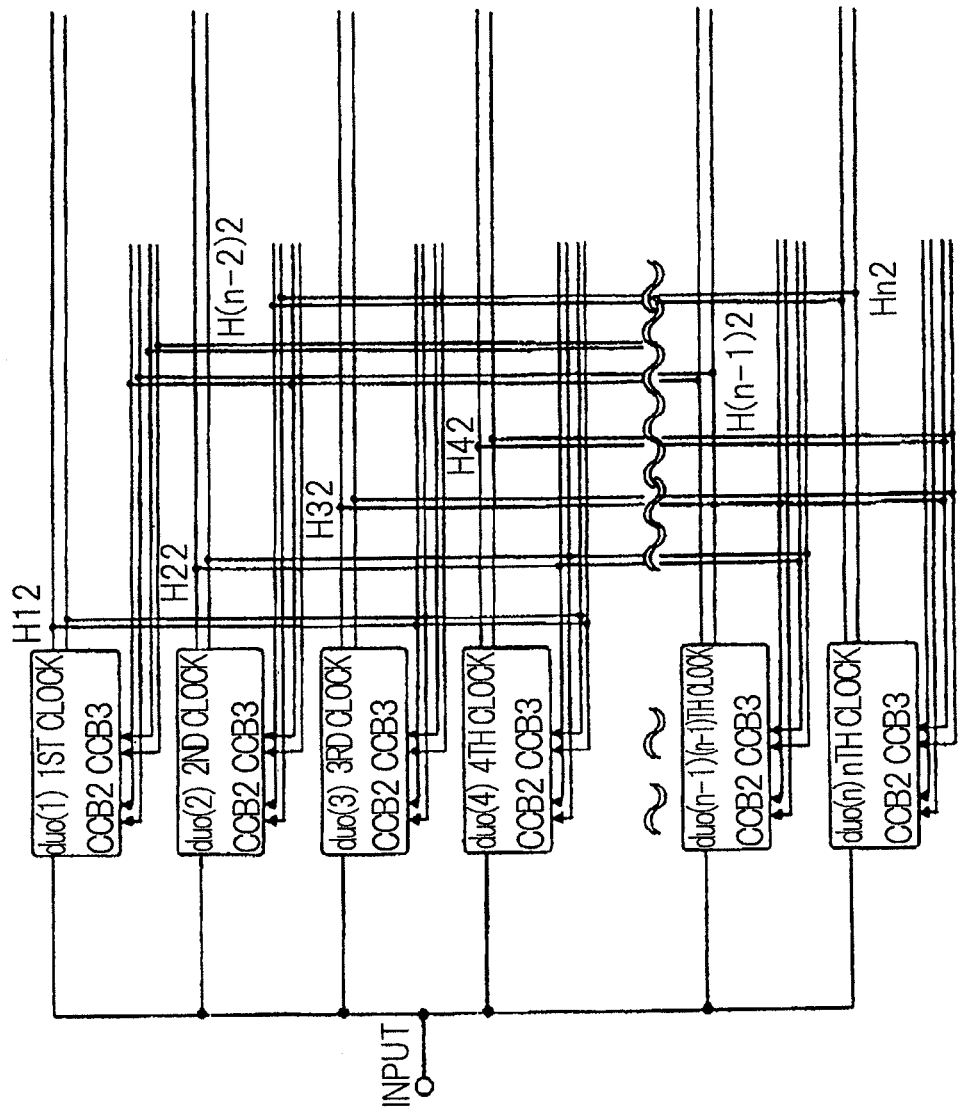
FIG. 14 is a block diagram of a duobinary decision feedback equalizer (multiphase clock (n-phase) reception) with feedback to CCB2 and CCB3.
Figure 15:
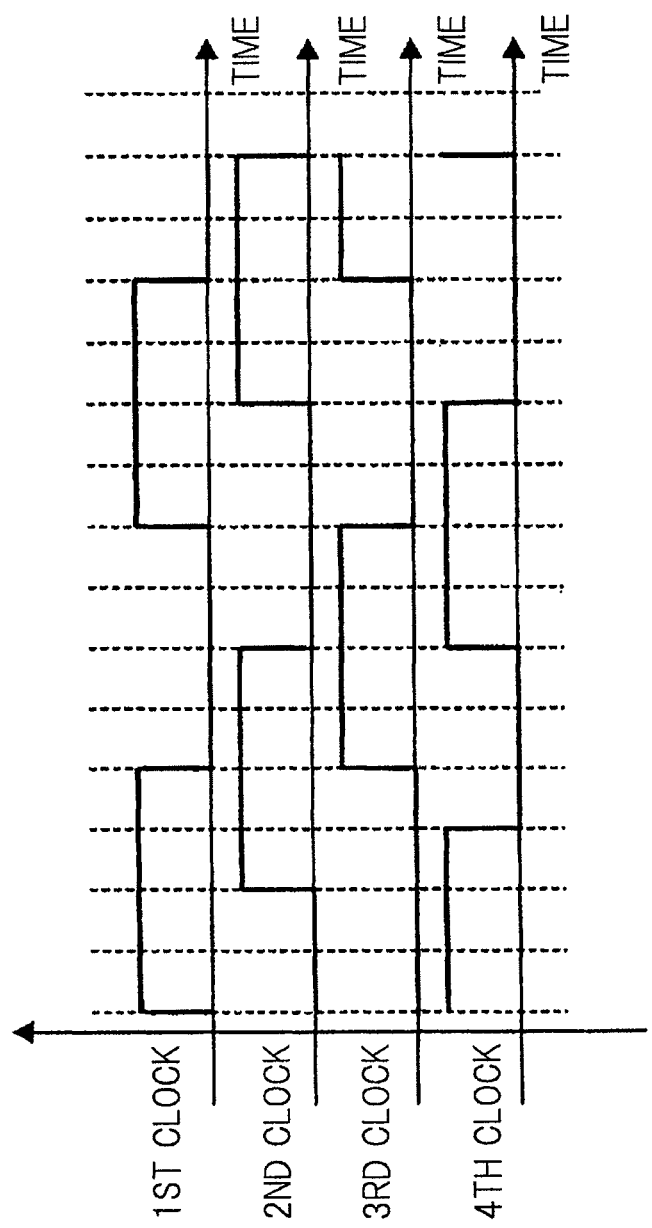
FIG. 15 is a timing diagram of multiphase clocks (four-phase clocks)

FIG. 14 shows another exemplary embodiment of a decision feedback equalizer for producing a duobinary waveform using multiphase clocks. The present exemplary embodiment represents a configuration for negatively feeding back, by two bits, data determined at each of multiphase clocks. Input data are supplied parallel to n (where n represents natural number) data reception blocks duo(0) through duo(n), which are supplied with clocks that are out of phase with each other. FIG. 15 is a timing diagram of four-phase clocks as multiphase clocks.

Figure 16:
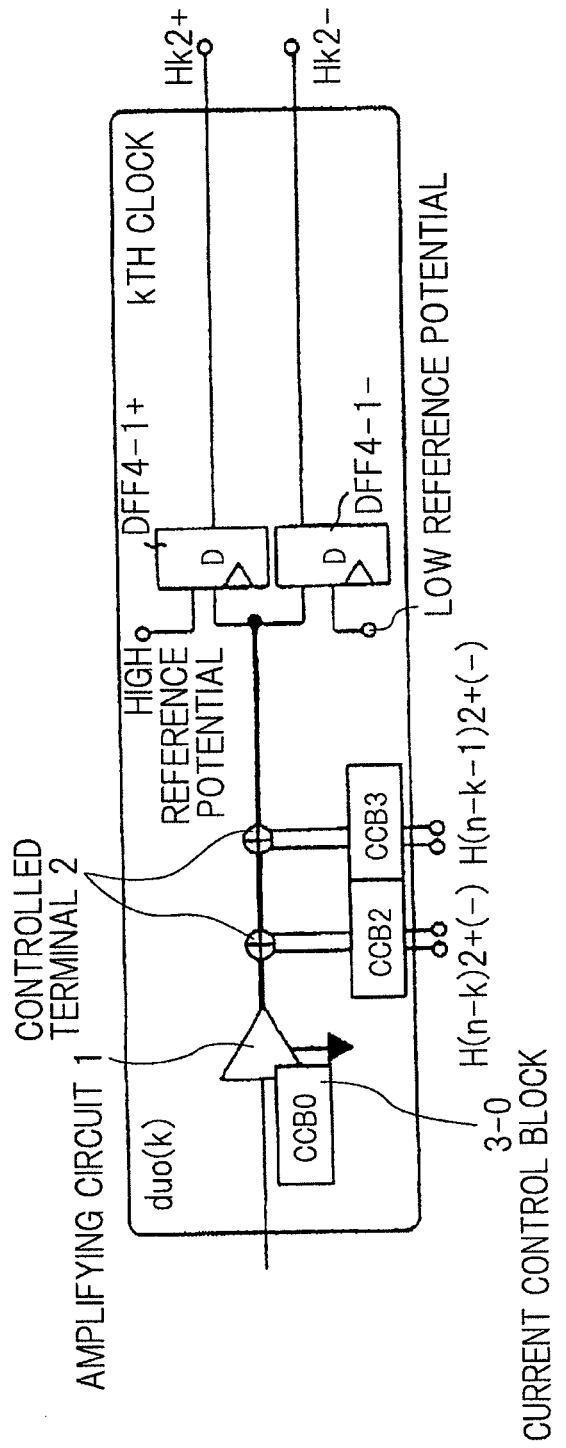
FIG. 16 is a block diagram of a data decision device of a duobinary decision feedback equalizer based on multiphase clocks with feedback to CCB2 and CCB3.

FIG. 16 is a block diagram of data reception block duo(k) for the kth clock. Input data are input to amplifying circuit 1 having current control block CCB0. Amplifying circuit 1 should desirably have a high-impedance input. Amplifying circuit 1 applies an output potential to controlled terminal 2 to which current control block CCB2 is connected. Output data h(n−k)2+, h(n−k)2− from data reception block duo(k−2) (where k=3, 4, ..., n) (where n represents a natural number of 3 or greater) are input to current control block CCB2. Current control block CCB2 of data reception block duo(1) is supplied with negative feedback data from data reception block duo(n−1), and current control block CCB2 of data reception block duo(2) is supplied with negative feedback data from data reception block duo(n). The potential at controlled terminal 2 is controlled depending on these negative feedback data h(n−k)21+, h(n−k)21−, shaping the input data into a duobinary waveform. The potential at controlled terminal 2 which is controlled by current control block CCB2 is input to two D flip-flops DFF4-1+, DFF4-1−. D flip-flop DFF4-1+ is supplied with a high reference potential, in addition to the potential at controlled terminal 2. Similarly, D flip-flop DFF4-1− is supplied with a low reference potential, in addition to the potential at controlled terminal 2. These reference potentials serve as comparative potentials for determining the duobinary signal which is of tertiary data. D flip-flops DFF4-1+, DFF4-1− compare the input data to determine whether they are "0" or "1".

Figure 17:
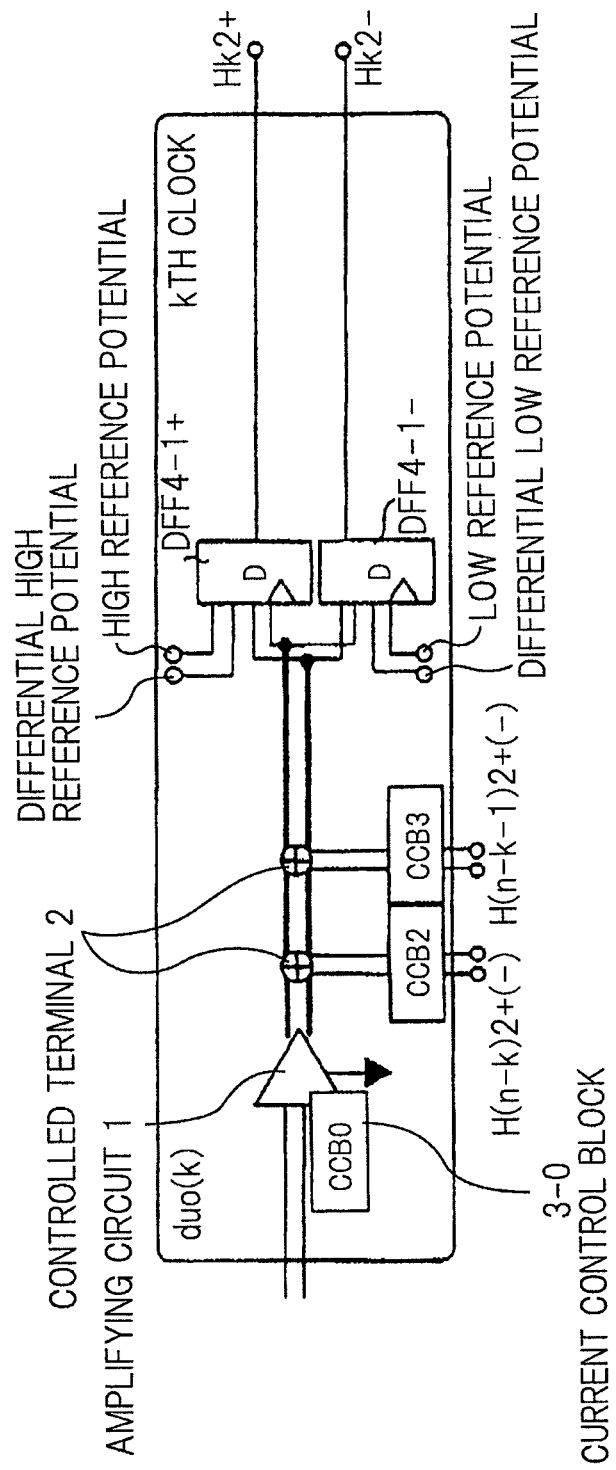
FIG. 17 is a block diagram of a data decision device of a duobinary decision feedback equalizer of differential configuration based on multiphase clocks with feedback to CCB2 and CCB3.

The above components may be of a differential configuration. FIG. 17 shows an example of the configuration thereof. Differential input signals are input to differential amplifying circuit 1, which applies a pair of differential output signals to controlled terminal 2 that is differential-current-controlled by current control block CCB2, shaping the input data into a duobinary signal. Output signals from controlled terminal 2 are input to D flip-flops DFF4-1+, DFF4-1− and differentially compared thereby with a high reference potential and a differential high reference potential and with a low reference potential and a differential low reference potential, which serve as differential reference potentials, respectively. The differential reference potentials are input symmetrically with respect to the common potential of differential duobinary signals, but may not be so input if they are to be adjusted to compensate for offset variations. If D flip-flops DFF4-1+, DFF4-1− comprise differential-output DFFs, then the data reception block produces differential output signals. If D flip-flops DFF4-1+, DFF4-1− comprise single-phase-output DFFs, then signal-phase signals are input to D flip-flops DFF4-2+, DFF4-2−, respectively, and are output as output signals H(k)2+, H(k)2− of the block. Output signals from D flip-flops DFF4-2+, DFF4-2− are output as output signals h(k)3+, h(k)3− of the kth clock block. These output potentials correspond to output signals Hk2, Hk3 (where k represents a natural number of n or smaller) of each kth clock block shown in FIG. 14.

The decision feedback equalizer of the above configuration realizes waveform equalization to produce a duobinary waveform.

4th Exemplary Embodiment

Figure 18:
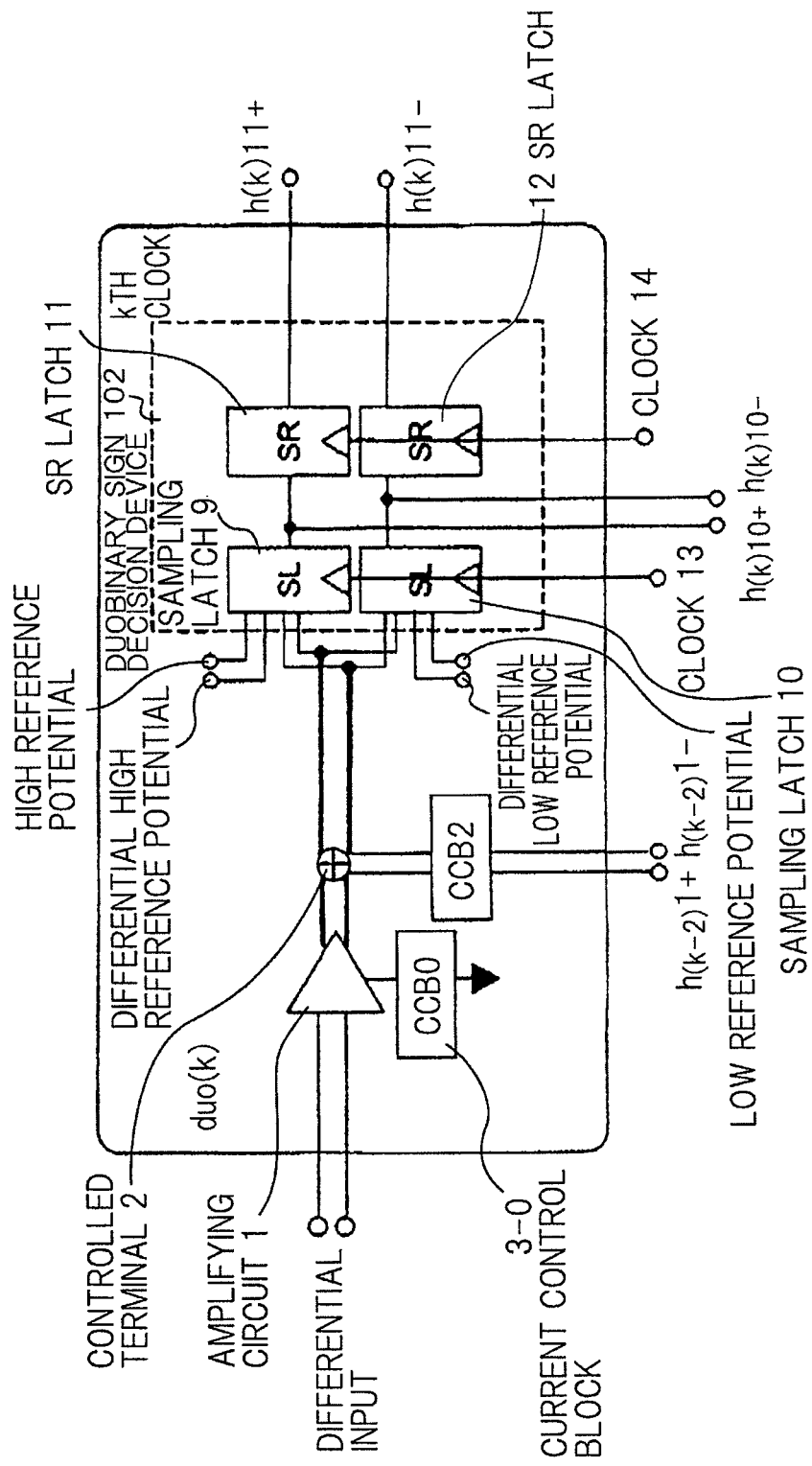
FIG. 18 is a diagram showing a configuration for feeding back data from latches in a duobinary decision device.
Figure 19:
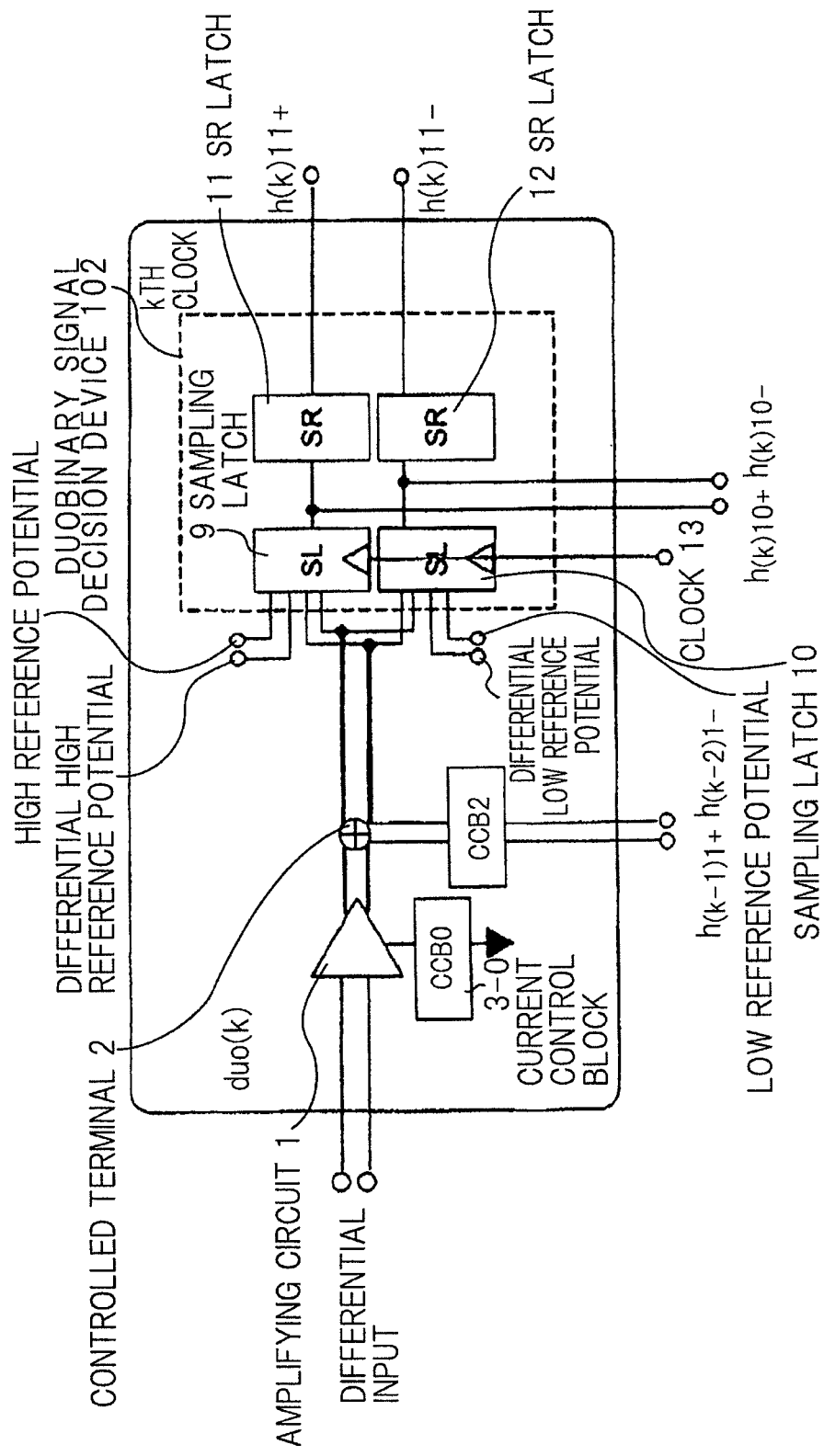
FIG. 19 is a diagram showing another configuration for feeding back data from latches in a duobinary decision device.

Even when multiphase clocks are employed, a problem associated with high communication rates is introduced in that the delay time of duobinary signal decision device 4 may be large. An exemplary embodiment for solving the problem will be described below. FIG. 18 shows the detailed configuration of the block shown in FIG. 13 for multiphase clocks that are employed. In the example shown in FIG. 13, duobinary signal decision device 4 comprises sampling latches 9, 10 and set-reset latches (SR latches) 11, 12. Sampling latches 10, 11 are supplied with clock 13, and SR latches 11, 12 with clock 14. As shown in FIG. 19, SR latches 11, 12 do not need to be synchronized with clocks. Sampling latches 10, 11 comprise precharged latches selectively operable depending on the potential of clock 13. Sampling latches 10, 11 may sample data when clock 13 is "H" and precharge data when clock 13 is "L", or vice versa. If feedback is too late 汗 as a result of not equalizing ISI on the bit immediately after the present signal, but due to equalizing ISI (second postcursor) on an input signal which is two bits after the present signal, using output signals h(k)11+(−) from duobinary signal decision device 4 as shown in FIG. 18, then the ISI is equalized by using output signals h(k)10+, h(k)10− from sampling latches 9, 10. In this case, since the data are reset to "H" or "L" when sampling latches 9, 10 are in their precharged period, they are not properly decision fed back. Consequently, the waveform of the second bit (second postcursor) is controlled and equalized during the sampling period. In particular, a multiphase clock system, e.g., an eight-phase clock configuration, samples data only once per eight bits. Generally, therefore, a sampling period of four bits can be used, and the waveform of the second postcursor can be equalized in the sampling period. With multiphase clocks being employed, therefore, the communication rate can be further increased by equalizing the output signals from the sampling latches in periods other than the precharged periods.

The invention claimed is:

1. A decision feedback equalizer comprising:
an amplifying circuit supplied with received data;
a duobinary signal decision device determining an output signal from said amplifying circuit, said duobinary signal decision device including a first D flip-flop and a second D flip-flop, said first D flip-flop supplied with said output signal and a high reference potential and outputting a result of a comparison between the high reference potential and said output signal, and said second D flip-flop supplied with said output signal and a low reference potential and outputting a result of a comparison between the low reference signal and said output signal;
a first shift register for successively shifting the result output by said first D flip-flop;
a second shift register for successively shifting the result output by said second D flip-flop; and
a plurality of current control blocks supplied with respective output signals from said first shift register and with respective output signals from said second shift register and for feeding back output signals to an output terminal of said amplifying circuit to control the potential thereof.

2. The decision feedback equalizer according to claim 1, wherein the output potential of said amplifying circuit is controlled externally.

3. The decision feedback equalizer according to claim 1, wherein the output potential of said amplifying circuit is adjusted by the amount of current of a current source.

4. The decision feedback equalizer according to claim 1, wherein said amplifying circuit has differential input and output signals.

5. The decision feedback equalizer according to claim 1, wherein said amplifying circuit has a differential amplifying circuit configuration.

6. The decision feedback equalizer according to claim 1, wherein said amplifying circuit has a differential peaking amplifier configuration.

7. The decision feedback equalizer according to claim 1, wherein said plurality of current control blocks includes a mechanism for controlling a current with a digital input signal.

8. A decision feedback equalizer comprising a plurality of parallel data reception blocks connected to a data input terminal, each of said parallel data reception blocks including an amplifying circuit supplied with received data, a duobinary signal decision device determining output data from said amplifying circuit, the duobinary signal decision device including a flip-flop, and one or more current control blocks controlling an output potential of said amplifying circuit;
wherein the data reception blocks are supplied with clocks which are out of phase with each other, and data determined by the duobinary signal decision device of each of the data reception blocks are negatively fed back to the current control block or blocks of another one of the data reception blocks.

9. The decision feedback equalizer according to claim 8, wherein the data reception block for a kth clock, where k=3 or greater than 3, is supplied with an output signal from the data reception block for a (k−2)th clock, the data reception block for a first clock is supplied with an output signal from the data reception block for a (n−1)th clock, where n is an integer greater than or equal to 2, and the data reception block for a second clock is supplied with an output signal from the data reception block for a nth clock.

10. The decision feedback equalizer according to claim 8, wherein the output potential of said amplifying circuit is controlled externally.

11. The decision feedback equalizer according to claim 8, wherein the output potential of said amplifying circuit is adjusted by the amount of current of a current source.

12. The decision feedback equalizer according to claim 8, wherein said amplifying circuit has differential input and output signals.

13. The decision feedback equalizer according to claim 8, wherein said amplifying circuit has a differential amplifying circuit configuration.

14. The decision feedback equalizer according to claim 8, wherein said amplifying circuit has a differential peaking amplifier configuration.

15. The decision feedback equalizer according to claim 8, wherein said duobinary signal device comprises a first comparator comparing a high reference potential and the output potential of said amplifying circuit, and a second comparator comparing a low reference potential and the output potential of said amplifying circuit.

16. The decision feedback equalizer according to claim 8, wherein said one or more current control blocks have a configuration ANDing a decision output signal from said duobinary signal decision device with respect to a high reference potential and a decision output signal from said duobinary signal decision device with respect to a low reference potential.

17. The decision feedback equalizer according to claim 8, wherein said duobinary signal decision device has a differential configuration, and said one or more current control blocks have a configuration ANDing both main levels and differential levels of a decision output signal from said duobinary signal decision device with respect to a high reference potential and a decision output signal from said duobinary signal decision device with respect to a low reference potential, said main levels being an output signal of said duobinary signal decision device and said differential levels being inverted data of said main levels.

18. The decision feedback equalizer according to claim 8, wherein said one or more current control blocks includes a mechanism for controlling a current with a digital input signal.

* * * * *

UNITED STATES PATENT AND TRADEMARK OFFICE
CERTIFICATE OF CORRECTION

PATENT NO.       : 8,743,944 B2
APPLICATION NO.  : 12/440880
DATED            : June 3, 2014
INVENTOR(S)      : Kazuhisa Sunaga et al.

It is certified that error appears in the above-identified patent and that said Letters Patent is hereby corrected as shown below:

In the Specification,

Column 3, Line 28: Delete "A tdfe" and insert -- Δtdfe --

In the Claims,

Column 10, Line 26: In Claim 1, after "and" delete "for"

Signed and Sealed this
Twenty-first Day of October, 2014

Michelle K. Lee
*Deputy Director of the United States Patent and Trademark Office*